N. E. KOCH.
ROLLER BEARING SLEEVE PULLER.
APPLICATION FILED AUG. 18, 1919.
1,334,658.  Patented Mar. 23, 1920.
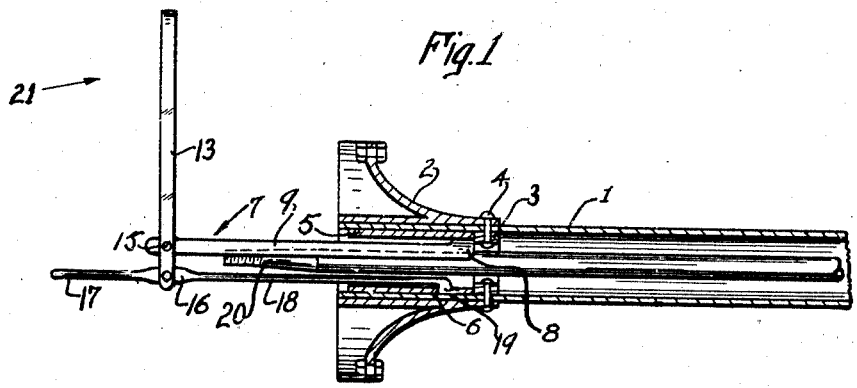
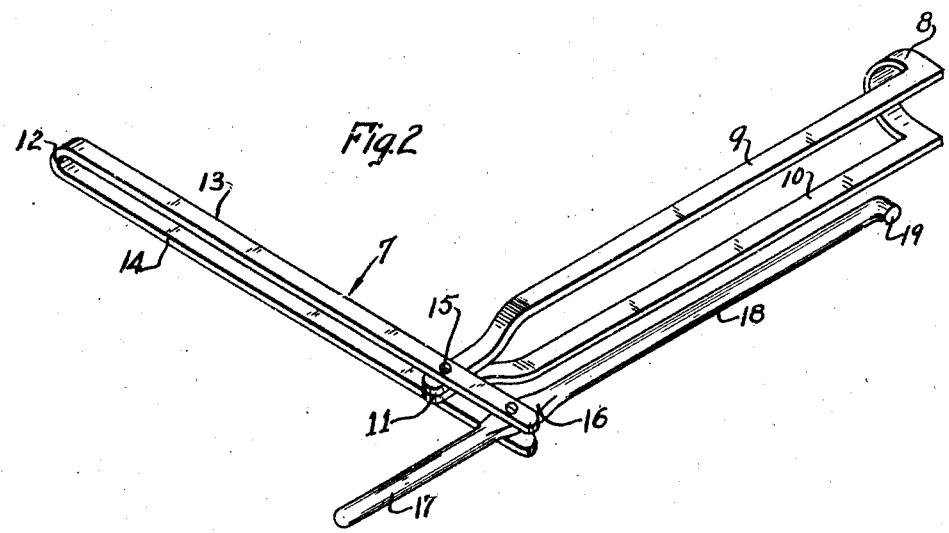
INVENTOR.
Nicholas E. Koch
BY
Hazard & Miller
ATTORNEYS

UNITED STATES PATENT OFFICE.

NICHOLAS E. KOCH, OF LOS ANGELES, CALIFORNIA.

ROLLER-BEARING-SLEEVE PULLER.

1,334,658.     Specification of Letters Patent.     Patented Mar. 23, 1920.

Application filed August 18, 1919. Serial No. 318,426.

*To all whom it may concern:*

Be it known that I, NICHOLAS E. KOCH, a citizen of the United States, residing at Los Angeles, in the county of Los Angeles and State of California, have invented new and useful Improvements in Roller-Bearing-Sleeve Pullers, of which the following is a specification.

My object is to make a roller bearing sleeve puller, and my invention consists of the novel features herein shown, described and claimed.

Figure 1 is a sectional detail of one end of the rear axle housing and showing a roller bearing sleeve puller embodying the principles of my invention in operation.

Fig. 2 is a perspective of the sleeve puller.

The rear axle housing 1 has a fitting 2 upon its end for mounting the brake construction. The stop collar 3 fits within the axle housing 1 and rivets 4 extend through the fitting 2, through the axle housing 1, and through the stop collar 3. The roller bearing sleeve 5 fits in the axle housing 1 against the stop collar 3 and has an opening 6. When it is desired to remove the sleeve 5 for repairing the bearing 6 the roller bearing sleeve puller 7 is brought into use. The details of the roller bearing sleeve puller 7 are as follows:

The foot 8 is made of flat metal curved to substantially a half circle and is adapted to fit within the sleeve 5 against the stop collar 3. Arms 9 and 10 extend from the ends of the foot 8, and the outer ends of the arms 9 and 10 are bent and brought together to make a bearing 11.

The lever consists of the return bend portion 12. The parallel arms 13 and 14 straddling the bearing 11 and secured in place by the pivot pin 15 and extending some distance beyond the pivot pin 15. The pulling tool is a strong round bar having a flattened bearing portion 16, a handle portion 17, a dimension portion 18, and a tooth 19. The dimension portion 18 is nearly as long as the arms 9 and 10, so that when the foot 8 is against the stop collar 3 the handle is beyond the axle spindle 20.

The handle 17 is manipulated to bring the tooth 19 into the opening 6 then pressure against the handle in the direction indicated by the arrow 21 will push the foot 8 against the stop collar 3 and pull the sleeve 5 from its seat in the axle housing 1.

Various changes may be made without departing from the spirit of my invention as claimed.

I claim:

1. A roller bearing sleeve puller comprising a foot bent to a semicircle and adapted to pass within the sleeve and engage a stop collar, arms extending from the ends of the foot, a bearing at the outer ends of the arms, a lever pivotally connected to the bearing, and a pulling tool pivotally connected to the lever and having a tooth adapted to engage in a hole in the sleeve.

2. A roller bearing sleeve puller comprising a foot bent to a semicircle and adapted to pass within the sleeve and engage a stop collar, arms extending from the ends of the foot, a bearing at the outer ends of the arms, a lever pivotally connected to the bearing, and a pulling tool pivotally connected to the lever and having a handle extending from one end and a tooth extending from the other end and adapted to engage in a hole in the sleeve.

In testimony whereof I have signed my name to this specification.

NICHOLAS E. KOCH.